US012668186B2

(12) United States Patent
Mitsuya

(10) Patent No.: US 12,668,186 B2
(45) Date of Patent: Jun. 30, 2026

(54) SYNTHETIC IMAGE GENERATION SYSTEM AND REAR IMAGE DISPLAY SYSTEM

(71) Applicant: ALPS ALPINE CO., LTD., Tokyo (JP)

(72) Inventor: Kota Mitsuya, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/973,690

(22) Filed: Dec. 9, 2024

(65) Prior Publication Data

US 2025/0196773 A1     Jun. 19, 2025

(30) Foreign Application Priority Data

Dec. 15, 2023     (JP) .................................. 2023-212297

(51) Int. Cl.
B60R 1/26          (2022.01)
(52) U.S. Cl.
CPC .......... B60R 1/26 (2022.01); B60R 2300/303 (2013.01); B60R 2300/8066 (2013.01)
(58) Field of Classification Search
CPC ............... B60R 1/26; B60R 2300/303; B60R 2300/8066; B60R 1/06; G06V 20/56;
(Continued)

(56) References Cited

U.S. PATENT DOCUMENTS 6,215,914 B1     4/2001     Nakamura et al.
10,009,551 B1 *  6/2018     Adcock .................. H04N 5/265
(Continued)

FOREIGN PATENT DOCUMENTS

EP     2182485     5/2010
EP     2846532     3/2015
(Continued)

OTHER PUBLICATIONS

Jean-Baptiste Thomas et al: "Cross-Media Color Reproduction and Display Characterization" In: "Advanced Color Image Processing and Analysis", Jan. 1, 2013 (Jan. 1, 2013), Springer New York, XP093271448, ISBN: 978-1-4419-6190-7 pp. 97-97, Retrieved from the Internet: URL:https://link.springer.com/content/pdf/10. 1007/978-1-4419-6190-7.pdf> * p. 97, paragraph 2—paragraph 3 *.
(Continued)

*Primary Examiner* — Marnie A Matt
(74) *Attorney, Agent, or Firm* — IPUSA, PLLC

(57)          ABSTRACT

A synthetic image generation system for generating a synthetic image by synthesizing a first image captured by a first camera and a second image captured by a second camera is provided. At least a part of the field of view of the first camera and at least a part of the field of view of the second camera overlap each other. The synthetic image is an image in which at least a part of the first image and at least a part of the second image are joined together. The synthetic image generation system at least includes a first image conversion unit, a second image conversion unit, a comparative image extracting unit, a correction gain calculation unit, a correction unit, a second image inverse-conversion unit, and a synthesis unit.

11 Claims, 9 Drawing Sheets

(58) Field of Classification Search
CPC . G06T 2207/10024; G06T 2207/20221; G06T 2207/30252; G06T 5/50; H04N 23/951; H04N 7/181; H04N 23/64; H04N 23/76; H04N 23/84
USPC ........................................................ 348/148
See application file for complete search history.

(56) References Cited

U.S. PATENT DOCUMENTS

| | | | |
|---|---|---|---|
| 2002/0145662 A1* | 10/2002 | Mizusawa ................ | B60D 1/62 348/113 |
| 2002/0196340 A1 | 12/2002 | Kato et al. | |
| 2012/0062745 A1* | 3/2012 | Han ...................... | B60W 30/12 348/148 |
| 2014/0079333 A1* | 3/2014 | Hirai ......................... | G06T 5/73 382/255 |
| 2015/0206296 A1* | 7/2015 | Hosono ................ | H04N 1/6002 382/167 |
| 2016/0280136 A1* | 9/2016 | Besson ..................... | B60R 1/31 |
| 2017/0161566 A1* | 6/2017 | Sung ...................... | G06V 20/56 |
| 2018/0084159 A1* | 3/2018 | Harada ..................... | H04N 5/05 |
| 2019/0248288 A1* | 8/2019 | Oba .......................... | B60R 1/26 |
| 2019/0297257 A1* | 9/2019 | Ishibashi ................ | H04N 23/90 |
| 2020/0010018 A1* | 1/2020 | Maruoka ................ | B60R 1/003 |

FOREIGN PATENT DOCUMENTS

| | | |
|---|---|---|
| JP | H11-102430 | 4/1999 |
| JP | 2002-324235 | 11/2002 |
| JP | 2008-017197 | 1/2008 |
| JP | 2009-206747 | 9/2009 |

OTHER PUBLICATIONS

Extended European Search Report for 24218740.9 mailed on May 12, 2025.

* cited by examiner

FIG.7 a

| | FIRST IMAGE | SECOND IMAGE | CORRECTION GAIN |
|---|---|---|---|
| R | 109.62 | 115.20 | 0.95 |
| G | 72.84 | 49.19 | 1.48 |
| B | 18.76 | 0.48 | 39.08 | b

| | FIRST IMAGE | POST-CONVERSION FIRST IMAGE | SECOND IMAGE | POST-CONVERSION SECOND IMAGE | CORRECTION GAIN |
|---|---|---|---|---|---|
| R | 109.62 | 182.81 | 115.20 | 185.60 | 0.98 |
| G | 72.84 | 164.42 | 49.19 | 152.60 | 1.08 |
| B | 18.76 | 137.38 | 0.48 | 128.24 | 1.07 | c

| | FIRST IMAGE | POST-CONVERSION FIRST IMAGE | SECOND IMAGE | POST-CONVERSION SECOND IMAGE | CORRECTION GAIN |
|---|---|---|---|---|---|
| R | 109.62 | 237.62 | 115.20 | 243.20 | 0.95 |
| G | 72.84 | 200.84 | 49.19 | 177.19 | 1.13 |
| B | 18.76 | 146.76 | 0.48 | 128.48 | 1.14 |

FIRST IMAGE

SECOND IMAGE

SYNTHETIC IMAGE

NG

FIRST IMAGE

SECOND IMAGE

SYNTHETIC IMAGE

SYNTHETIC IMAGE GENERATION SYSTEM AND REAR IMAGE DISPLAY SYSTEM

The present application claims priority under 35 USC § 119 to Japanese Patent Application No. 2023-212297, filed Dec. 15, 2023, the entire contents of which are incorporated herein by reference.

BACKGROUND OF THE INVENTION

Field of the Invention

The present disclosure relates to a technique for synthesizing images captured by multiple cameras having partially-overlapping fields of view.

Description of the Related Art

There is a technique for synthesizing images captured by multiple cameras having partially-overlapping fields of view. According to this technique, for example:

(1) multiple cameras that capture images around a vehicle are positioned such that their respective fields of view partially overlap each other;

(2) a portion of an image captured by each camera overlapping another camera's or other cameras' field(s) of view is used as a comparative image, and the mean value of pixel values in each comparative image is determined; and (3) the ratio of the mean value of pixel values in a comparative image taken from one image (hereinafter referred to as a "first image") to the mean value of pixel values in a comparative image taken from another image (hereinafter referred to as a "second image") is calculated as a correction gain; and (4) the gain of the second image is corrected based on the correction gain calculated above, the first image and the gain-corrected second image are synthesized, and the resulting synthetic image is displayed.

This prevents or substantially prevents the individual images constituting the synthetic image from losing seamlessness due to differences in color tone, brightness, and so forth between the individual images (see, for example, Unexamined Japanese Patent Application Publication No. H11-102430 and Unexamined Japanese Patent Application Publication No. 2002-324235).

Also, there is another technique related to the present disclosure: the point of view in each image captured by left and right cameras placed in left and right side parts of a car (automobile) and showing a rear view from the car is converted; the images after the viewpoint conversion are synthesized with an image captured by a camera placed in a rear part of the car and showing a rear view from the car; and the resulting synthetic image is displayed on a monitor installed in the car (see, for example, Unexamined Japanese Patent Application Publication No. 2009-206747).

SUMMARY OF THE INVENTION

In view of the foregoing, the present disclosure aims to provide a synthetic image generation system for correcting and synthesizing images captured by multiple cameras having partially-overlapping fields of view. With this system the present disclosure aims to prevent or substantially prevent individual images constituting a synthetic image from losing seamlessness due to the correction, thereby preventing or substantially preventing the individual images from looking flawed.

To achieve the above goal, the present disclosure provides a synthetic image generation system for generating a synthetic image by synthesizing a first image captured by a first camera and a second image captured by a second camera, at least a part of a field of view of the first camera and at least a part of a field of view of the second camera overlapping each other, the synthetic image being an image in which at least a part of the first image and at least a part of the second image are joined together.

This synthetic image generation system includes:

a first image conversion unit configured to apply a predetermined image conversion to the first image to generate a post-conversion first image;

a second image conversion unit configured to apply the predetermined image conversion to the second image to generate a post-conversion second image;

a comparative image extracting unit configured to extract:

a predetermined part or a portion of the predetermined part of the post-conversion first image for use as a first comparative image, the predetermined part of the post-conversion first image capturing the part of the field of view of the first camera overlapping the field of view of the second camera; and a predetermined part of the post-conversion second image for use as a second comparative image, the predetermined part of the post-conversion second image capturing a part of the field of view of the second camera that is same as that captured in the first comparative image;

a correction gain calculation unit configured to calculate a ratio of a representative value among pixel values of the first comparative image to a representative value among pixel values of the second comparative image as a correction gain for the post-conversion second image;

a correction unit configured to correct the post-conversion second image based on the correction gain to generate a post-correction second image;

a second image inverse-conversion unit configured to apply an inverse conversion of the predetermined image conversion to the post-correction second image to generate a post-inverse-conversion second image; and a synthesis unit configured to synthesize the post-inverse-conversion second image with the first image or with an image obtained by applying the inverse-conversion of the predetermined image conversion to the post-conversion first image, to generate a synthetic image.

In this synthetic image generation system, the predetermined image conversion is performed such that a ratio of a pixel value in the post-conversion first image, obtained from a first pixel value in the first image through the predetermined image conversion, to a pixel value in the post-conversion second image, obtained from a second pixel value in the second image through the predetermined image conversion, is closer to 1 than is a ratio of the first pixel value to the second pixel value.

Whereas the related art such as those cited above has to extract a first comparative image and a second comparative image from a first image and a second image, respectively, calculate the ratio of a representative value among the pixel values of the first image and a representative value among the pixel values of the second image as a correction gain, correct the second image based on the correction gain, and synthesize the post-correction second image with the first image to generate a synthetic image, according to the present disclosure's synthetic image generation system, it is possible to keep low the amount of increase of the pixel values of the post-inverse-conversion second image, which is the second image to be synthesized with the first image to generate a synthetic image, from those of the original second image. Also, it is possible to prevent or substantially prevent the pixel values of the second image to be synthesized from being saturated and the synthetic image from having a part with a strange color tone, relatively simple calculation process.

BRIEF DESCRIPTION OF THE DRAWINGS

FIG. 2A-1 is a diagram showing positions of various cameras according to an embodiment of the present disclosure;

FIG. 2A-2 is a diagram showing positions of various cameras according to an embodiment of the present disclosure;

FIG. 7 is a diagram showing example effects brought about by an embodiment of the present disclosure;

DETAILED DESCRIPTION OF THE DISCLOSURE

According to the above-described technique of calculating the ratio of a mean value of a comparative image taken from a first image to a mean value of a comparative image taken from a second image as a correction gain, correcting the second image's gain based on the correction gain, and synthesizing the post-gain-correction second image with the first image, an extremely large correction gain might be calculated if, for example, the first and second comparative images have low pixel values.

In this case, when the second image is corrected based on the calculated correction gain, a case might arise in which a part with a large pixel value is produced in the second image, outside the comparative image's part, and the pixel value becomes saturated after the correction, making the part one with a strange tone of color and making the post-correction second image look flawed.

According to the present disclosure, a synthetic image generation system for correcting and synthesizing images captured by multiple cameras having partially-overlapping fields of view is provided, so that it is possible to prevent or substantially prevent individual images constituting a synthetic image from losing seamlessness due to the correction, thus preventing or substantially preventing the individual images from looking flawed.

Figure 1:
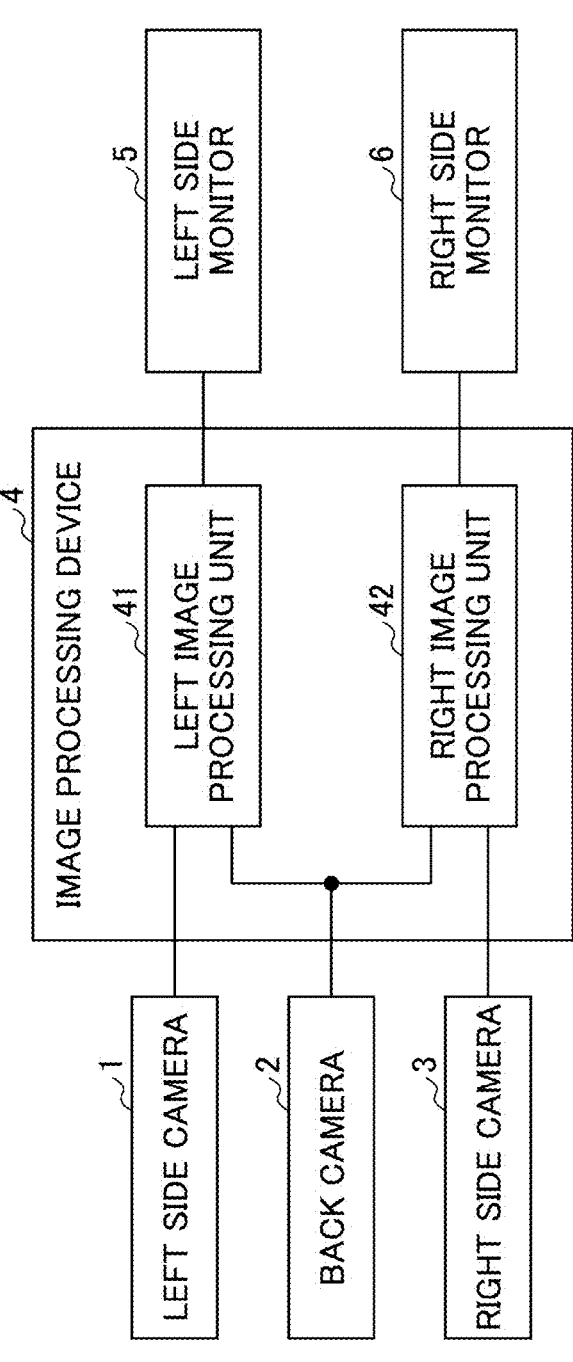
FIG. 1 is a block diagram showing a structure of an image display system according to an embodiment of the present disclosure.
Figures 1, 2A:
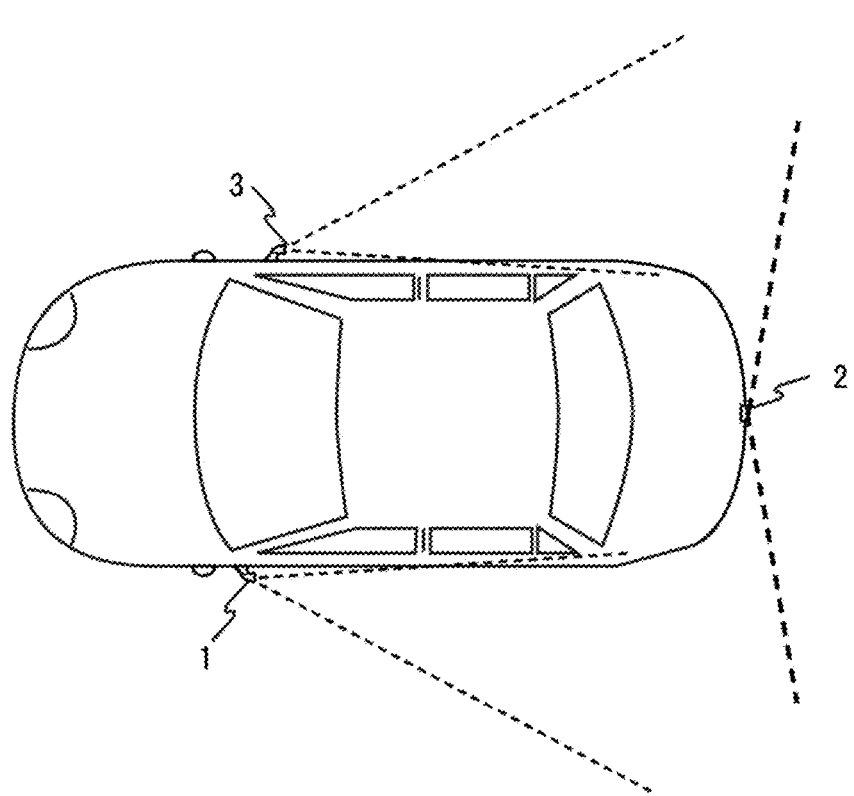
Figures 2, 2A:
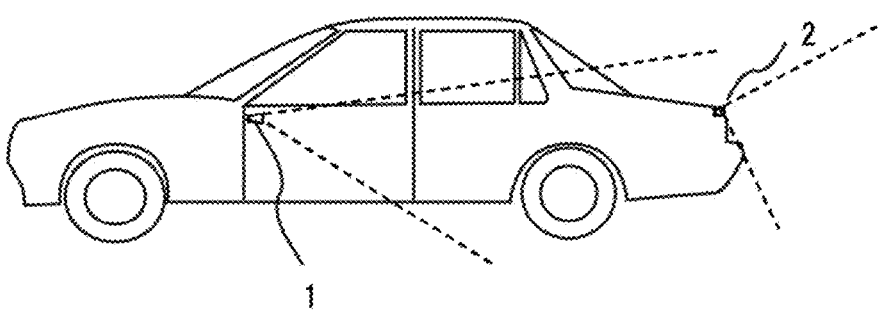

An embodiment of the present disclosure will be described below. FIG. 1 shows a structure of an image display system according to the present embodiment. The image display system is a system to be mounted in a car. As shown in the drawing, the image display system includes a left side camera 1, a back camera 2, a right side camera 3, an image processing device 4, a left side monitor 5, and a right side monitor 6. Given this structure of the image display system, as shown in FIG. 2A-1 and FIG. 2A-2, the back camera 2 is positioned in a rear part of the car and captures the car's rear view from there. Also, the left side camera 1 is positioned in a left side part of the car and captures the car's rear view from there, and the right side camera 3 is positioned in a right side part of the car and captures the car's rear view from there. Here, the back camera 2, the left side camera 1, and the right side camera 3 output images, in which the values of the R (red), G (green), and B (blue) components of the images serve as their pixel values.

Figure 2B:
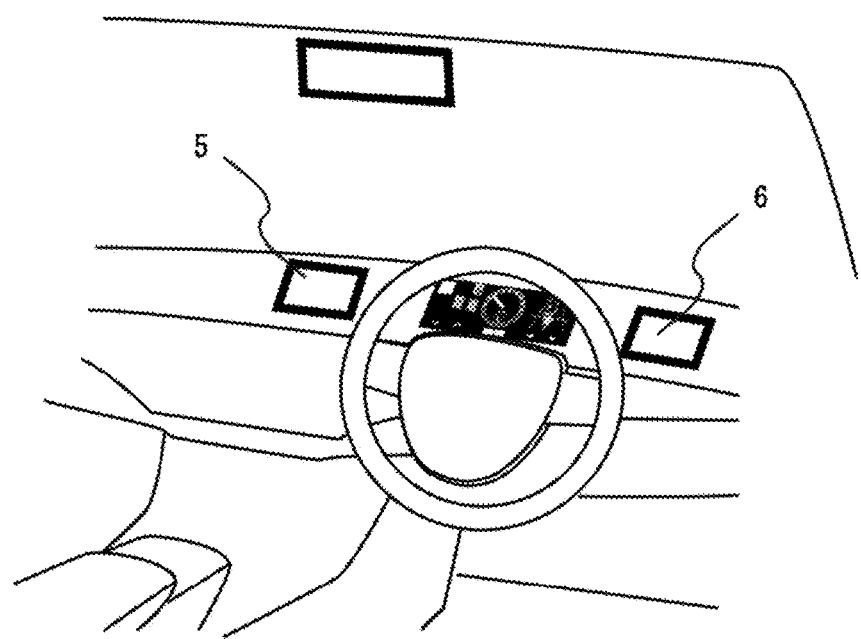
FIG. 2B is a diagram showing positions of various monitors according to an embodiment of the present disclosure.

Also, the fields of view of the back camera 2 and the left side camera 1 partially overlap each other behind the car, and the fields of view of the back camera 2 and the right side camera 3 partially overlap each other behind the car. Also, the left side monitor 5 and the right side monitor 6 are displays for displaying images. For example, as shown in FIG. 2B, the left side monitor 5 is positioned to be located to the left with respect to the center of the driver's seat in the left-right direction, and the right side monitor 6 is positioned to be located to the right with respect to the center of the driver's seat in the left-right direction.

Referring back to FIG. 1, the image processing device 4 includes a left image processing unit 41 and a right image processing unit 42. The left image processing unit 41 synthesizes an image captured by the left side camera 1 and an image captured by the back camera 2, and displays the resulting synthetic image on the left side monitor 5. The right image processing unit 42 synthesizes an image captured by the right side camera 3 and an image captured by the back camera 2, and displays the resulting synthetic image on the right side monitor 6. Note that the image processing device 4 refers to an electronic circuit such as a CPU, an FPGA, and an ASIC that implements various types of image processing described herein by running programs or instruction codes stored in a memory of the like, or by being designed as a circuit for special usage.

Figure 3:
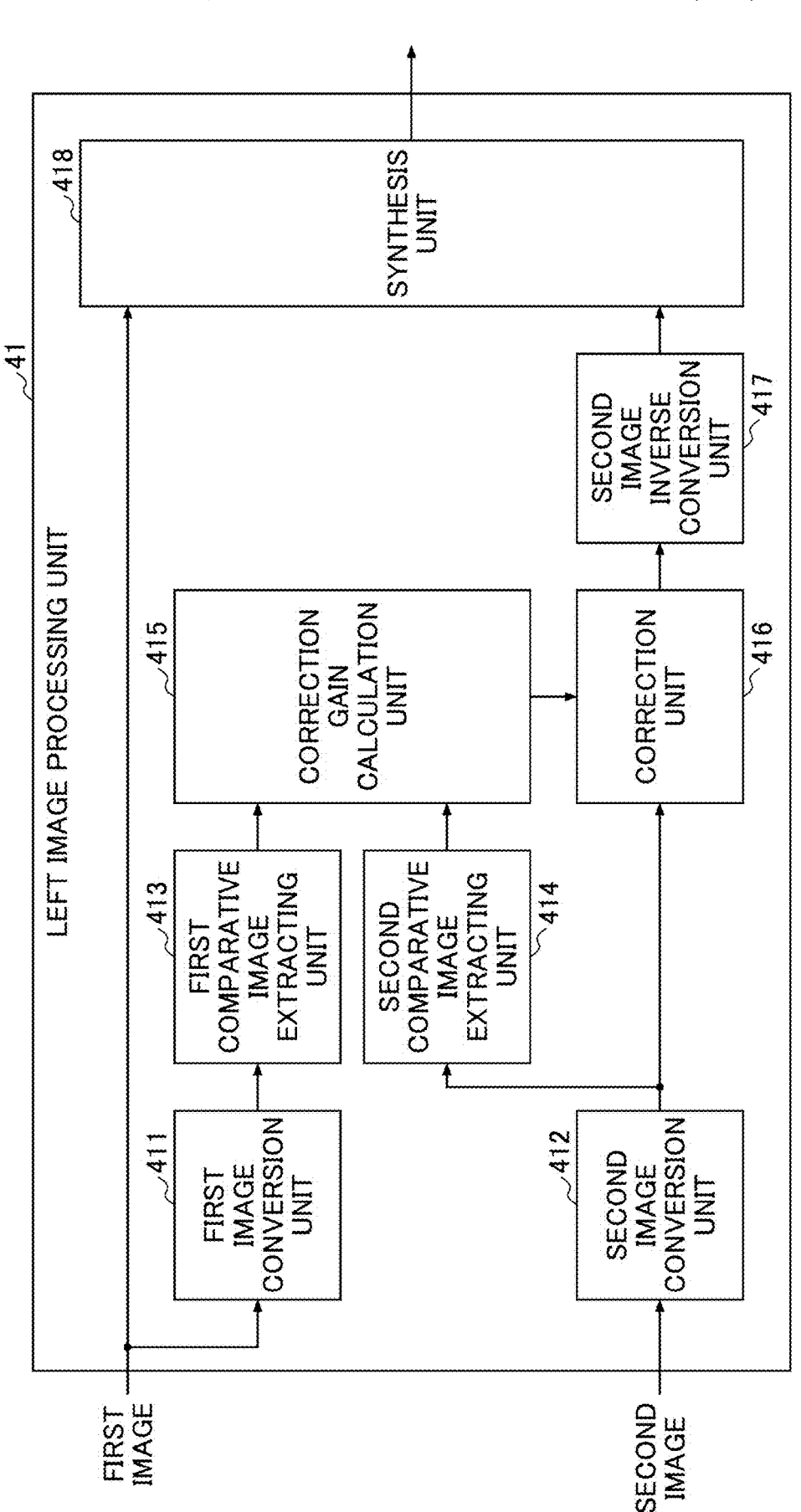
FIG. 3 is a block diagram showing a structure of a left-image generation process unit according to an embodiment of the present disclosure.

The left image processing unit 41 and right image processing unit 42 will be described below. The left image processing unit 41 and right image processing unit 42 are structured alike and operate alike. Therefore, the left image processing unit 41 alone will be described as a representative example. Note that the following description of the left image processing unit 41 may be read as one for the right image processing unit 42 by replacing the word "left" with "right." FIG. 3 shows a structure of the left image processing unit 41. As shown in the drawing, the left image processing unit 41 includes a first image conversion unit 411, a second image conversion unit 412, a first comparative image extracting unit 413, a second comparative image extracting unit 414, a correction gain calculation unit 415, a correction unit 416, a second image inverse-conversion unit 417, and a synthesis unit 418. For example, an image captured by the left side camera 1 is input to the left image processing unit 41 as a first image, and an image captured by the back camera 2 is input as a second image. However, the left image processing unit 41 may also be structured such that an image captured by the back camera 2 is input as a first image and an image captured by the left side camera 1 is input as a second image.

The first image conversion unit 411 applies a predetermined image conversion to the first image to generate a post-conversion first image. The second image conversion unit 412 applies a predetermined image conversion to the second image to generate a post-conversion second image. The image conversion executed by the first image conversion unit 411 and the image conversion executed by the second image conversion unit 412 are the same. In this image conversion, the pixel values of the first image and second image are converted such that the ratio of a pixel value in the post-conversion first image to a pixel value in the post-conversion second image is closer to 1 than is the ratio of a pixel value in the original first image to a pixel value in the original second image. However, if the ratio of a pixel value in the original first image to a pixel value in the original second image is 1, the ratio of a pixel value in the post-conversion first image to a pixel value in the post-conversion second image may be kept at 1.

For example, assuming that the first image and the second image are each formed with eight R bits, eight G bits, and eight B bits, and are each an image of 256 gradation levels from the first level of gradation to the 256-th level of gradation, in which, in hexadecimal notation, "00" is the first level of gradation and "FF" is the 256-th level of gradation, to convert these images, for example, as shown in FIG. 4A-1 and FIG. 4A-2:

(1) the R components' gradation values in the individual pixels of the pre-conversion images may be multiplied by ½ and then 128 may be added to each resulting gradation value, so that the values obtained thus can be used as the R components' gradation values in the individual pixels constituting the post-conversion images;

(2) the G components' gradation values in the individual pixels of the pre-conversion images may be multiplied by ½ and then 128 may be added to each resulting gradation value, so that the values obtained thus can be used as the G components' gradation values in the individual pixels constituting the post-conversion images; and (3) the B components' gradation values in the individual pixels of the pre-conversion images may be multiplied by ½ and then 128 may be added to each gradation value, so that the values resulting obtained thus can be used as the B components' gradation values in the individual pixels constituting the post-conversion images.

Figure 4:
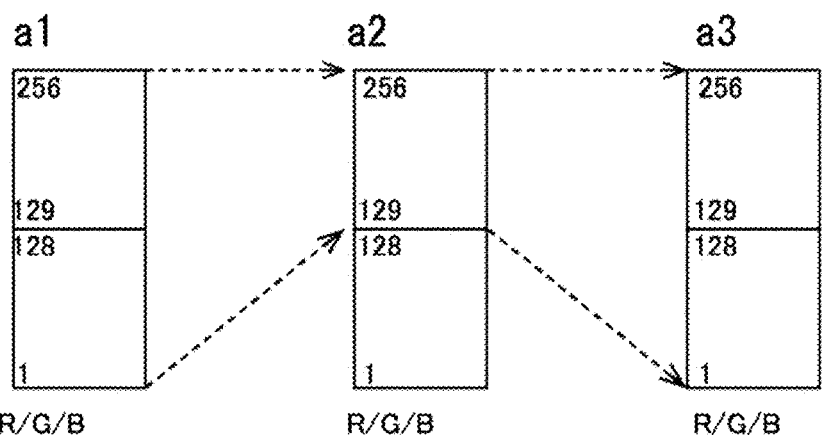
FIG. 4 is a diagram showing example operations of a left-image generation process unit according to an embodiment of the present disclosure.
Figure 4:
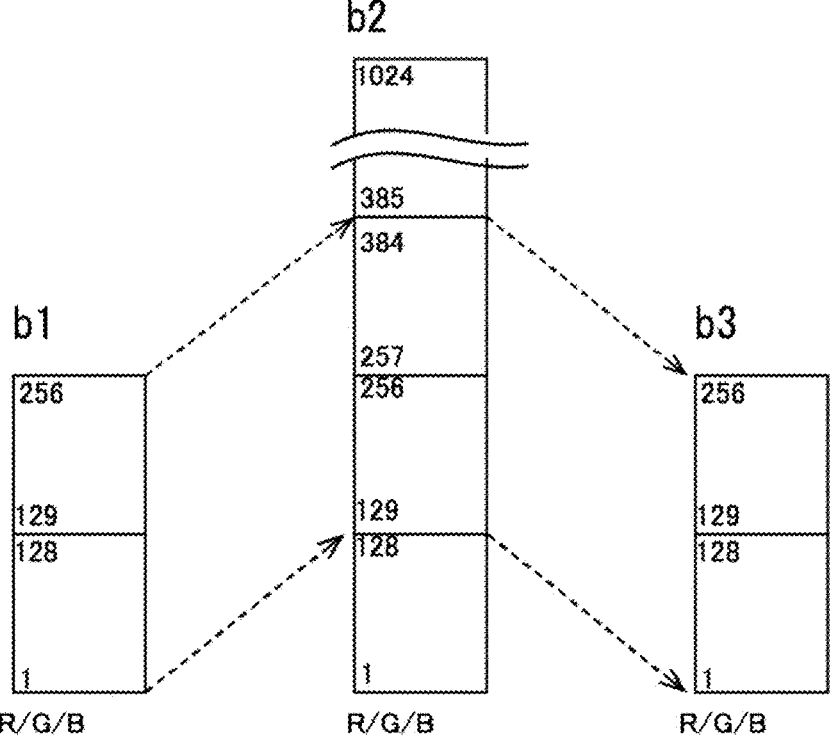

Alternatively, as shown by b1 and b2 in FIG. 4, assuming that the post-conversion first image and second image are each formed with ten R bits, ten G bits, and ten B bits, and are each an image of 1,024 gradation levels from the first level of gradation to the 1,024-th level of gradation, in which, in hexadecimal notation, "00" is the first level of gradation and "3FF" is the 1,024-th level of gradation, to convert these images, for example:

(1) the R components' gradation values in the individual pixels of the pre-conversion images may be multiplied by ½ and then 128 may be added to each resulting gradation value, so that the values obtained thus can be used as the R components' gradation values in the individual pixels constituting the post-conversion images;

(2) the G components' gradation values in the individual pixels of the pre-conversion images may be multiplied by ½ and then 128 may be added to each resulting gradation value, so that the values obtained thus can be used as the G components' gradation values in the individual pixels constituting the post-conversion images; and (3) the B components' gradation values in the individual pixels of the pre-conversion images may be multiplied by ½ and then 128 may be added to each resulting gradation value, so that the values obtained thus can be used as the B components' gradation values in the individual pixels constituting the post-conversion images.

Referring back to FIG. 3, in the first comparative image extracting unit 413, a part in the post-conversion first image, which corresponds to a portion of the part where the field of view of the left side camera 1 and the field of view of the back camera 2 overlap each other, is set in advance as a first comparative area, and the first comparative image extracting unit 413 extracts an image in the first comparative area in the post-conversion first image as a first comparative image.

Likewise, in the second comparative image extracting unit 414, a part in the post-conversion second image corresponding to the above-described first comparative area in the post-conversion first image, that is, a part in the post-conversion second image in which the same object is captured as in the first comparative area in the post-conversion first image, is set in advance as a second comparative area, and the second comparative image extracting unit 414 extracts an image in the second comparative area in the post-conversion second image as a second comparative image.

Then, for each of the R components, G components, and B components, the correction gain calculation unit calculates the ratio of a representative value of gradation values determined with respect to the first comparative image to a representative value of gradation values determined with respect to the second comparative image, as a correction gain. According to the present embodiment, each representative value is a mean value. However, other representative values such as the median, mode, or the like can also be used as well, depending on the usage and purpose of the image display system. Next, the correction unit 416 corrects the post-conversion second image by adjusting the gain of each of the R components, G components, and B components of the post-conversion second image, based on correction gains set in a correction gain setting part, and outputs the post-correction second image to the second image inverse-conversion unit 417. The second image inverse-conversion unit 417 applies an image conversion that works as an inverse conversion to the image conversion applied to the original second image in the second image conversion unit 412, to the post-conversion second image generated in the correction unit 416, and outputs a post-inverse-conversion second image to the synthesis unit 418. That is, as shown by a1 and a2 in FIG. 4, when the second image conversion unit 412 performs an image conversion to convert the gradation values of R components, G components, and B components on a per pixel basis, then, in the image conversion performed by the second image inverse-conversion unit 417, as shown by a2 and a3 of FIG. 4:

(1) 128 may be subtracted from the R components' gradation values in the individual pixels of the pre-conversion images, and the resulting values may be doubled and used as the R components' gradation values in the individual pixels constituting the post-conversion images;

(2) 128 may be subtracted from the G components' gradation values in the individual pixels of the pre-conversion images, and the resulting values may be doubled and used as the G components' gradation values in the individual pixels constituting the post-conversion images; and (3) 128 may be subtracted from the B components' gradation values in the individual pixels of the pre-conversion images, and the resulting values may be doubled and used as the B components' gradation values in the individual pixels constituting the post-conversion images.

Also, as shown by b1 and b2 in FIG. 4, when the second image conversion unit 412 performs an image conversion to convert the gradation values of R components, G components, and B components on a per pixel basis, in the image conversion performed by the second image inverse-conversion unit 417, as shown by b2 and b3 in FIG. 4:

(1) the gradation values from 1 to 256, represented by the lower 8 bits of each value obtained by subtracting 128 from the R components' gradation values in the individual pixels of the pre-conversion images may be used as the R components' gradation values in the individual pixels constituting the post-conversion images;

(2) the gradation values from 1 to 256, represented by the lower 8 bits of each value obtained by subtracting 128 from the G components' gradation values in the individual pixels of the pre-conversion images, may be used as the G components' gradation values in the individual pixels constituting the post-conversion images; and (3) the gradation values from 1 to 256, represented by the lower 8 bits of each value obtained by subtracting 128 from the B components' gradation values in the individual pixels of the pre-conversion images, may be used as the B components' gradation values in the individual pixels constituting the post-conversion images.

Referring back to FIG. 3, the post-inverse-conversion second image generated in the second image inverse-conversion unit 417 is subjected to a viewpoint conversion in the synthesis unit 418, into an image showing a rear view from the point of view of the left side camera 1. The synthesis unit 418 synthesizes an embedding image with the first image. The embedding image refers to the part of the post-inverse-conversion, post-viewpoint-conversion second image that is to be synthesized with the first image. As a result of this, one seamless image showing a rear view from the car is formed and output to and displayed on the left side monitor 5.

Figure 5:
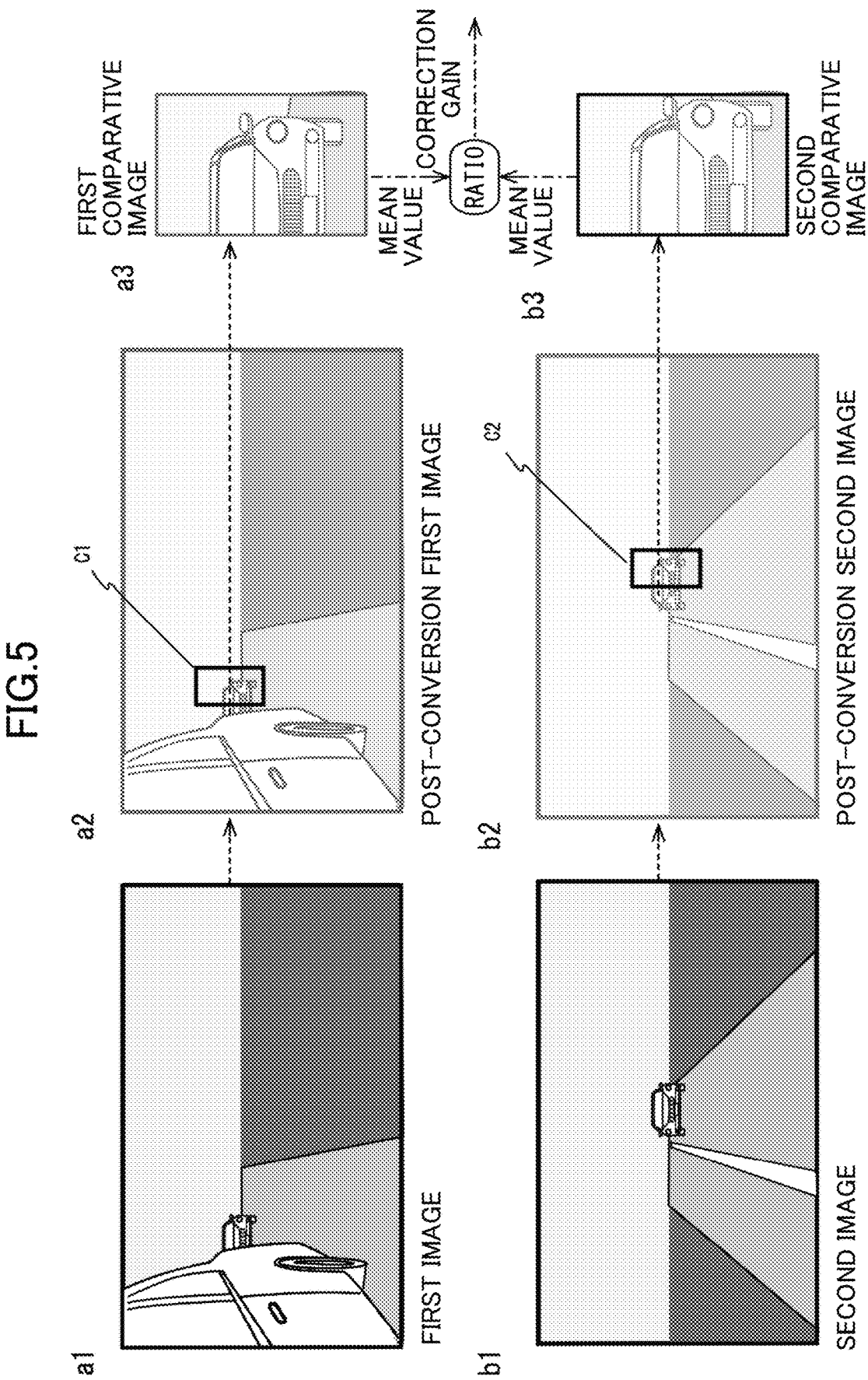
FIG. 5 is a diagram showing example operations of a left-image generation process unit according to an embodiment of the present disclosure.

An example process of the left image processing unit 41 will be shown below. Now, assume that a first image is captured by the left side camera 1 as shown by a1 in FIG. 5 and a second image is captured by the back camera 2 as shown by b1 in FIG. 5. In this case, in the first image conversion unit 411, for example, a post-conversion first image such as the one shown by a2 in FIG. 5 is generated from the first image of a1 of FIG. 5. Likewise, a post-conversion second image such as, for example, the one shown by b2 in FIG. 5 is generated from the second image of b1 of FIG. 5. Then, as shown by a3 in FIG. 5, the first comparative image extracting unit 413 extracts a first comparative image from the post-conversion first image of a2 in FIG. 5. The first comparative image is a part of the first comparative area C1, which is a portion of the part in which the field of view of the left side camera 1 and the field of view of the back camera 2 overlap each other. Also, as shown by b3 in FIG. 5, the second comparative image extracting unit 414 extracts a second comparative image from the post-conversion second image of b2 in FIG. 5. The second comparative image is a part of the second comparative area C2, which is set as a part that corresponds to the first comparative area C1.

Figure 6:
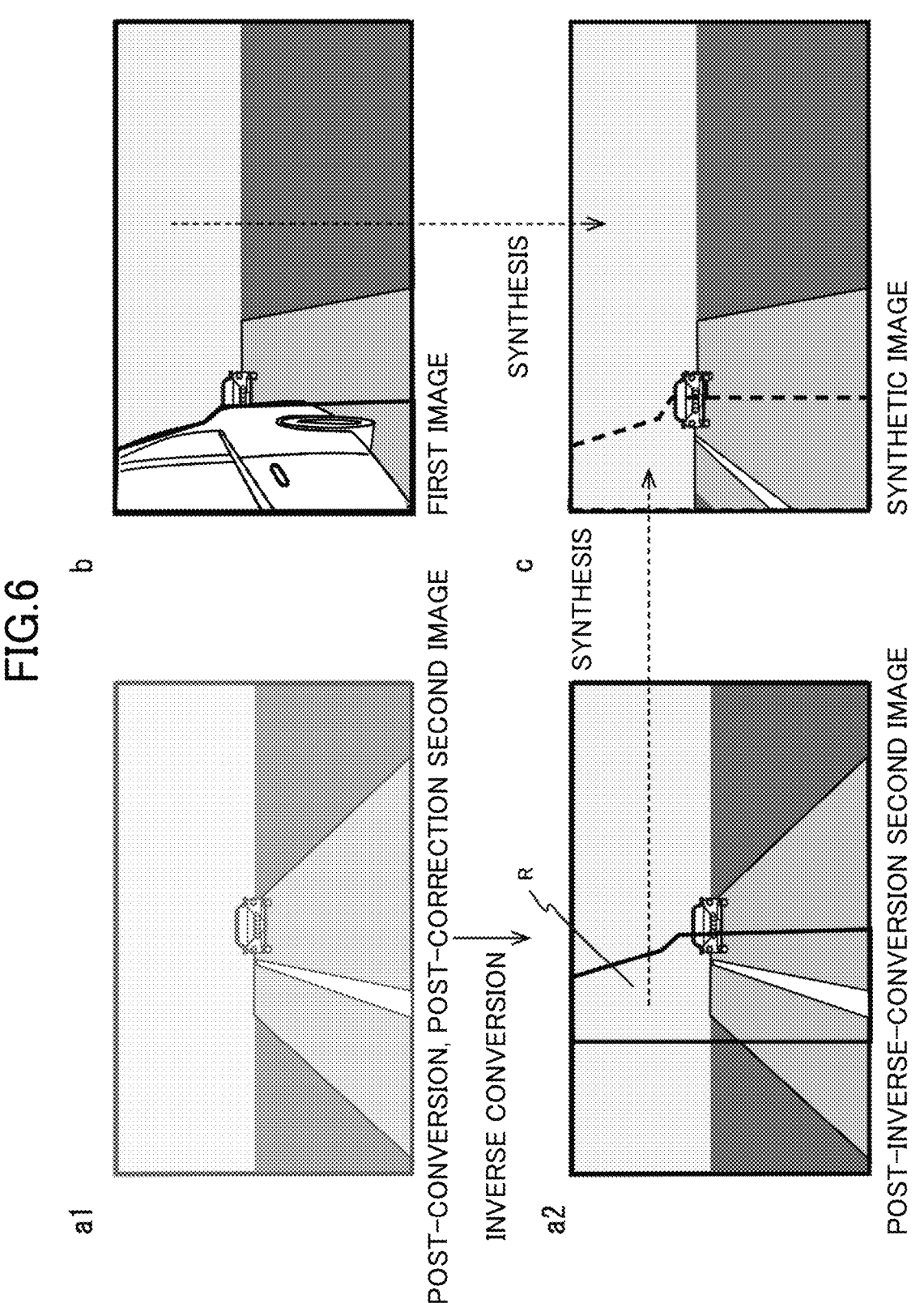
FIG. 6 is a diagram showing example operations of a left-image generation process unit according to an embodiment of the present disclosure.

Then, based on the first comparative image of a3 in FIG. 5 and the second comparative image of b3 in FIG. 5, the correction gain calculation unit 415 calculates the ratio of the mean value of gradation values in the first comparative image to the mean value of gradation values in the second comparative image, as a correction gain, for each of the R components, the G components, and the B components. Then, the gains of the post-inverse-conversion second image of b2 in FIG. 5 are adjusted based on the correction gains set thus, and the post-inverse-conversion, post-correction second image shown by a1 in FIG. 6 is generated. Also, the post-conversion, post-correction second image shown by a1 in FIG. 6 is subjected to an image conversion at the second image inverse-conversion unit 417, and the post-inverse-conversion second image shown by a2 in FIG. 6 is generated.

Here, the agreement between the mean values of gradation values in the first comparative image that has undergone corrections based on correction gains and the mean values of gradation values in the second comparative image is inherited between the first image and the post-inverse-conversion second image generated. The respective mean values of R components, G components, and B components in the area corresponding to the second comparative area C2 in the post-inverse-conversion second image are consistent with the respective mean values of R components, G components, and B components in the area corresponding to the first comparative area C1 in the original second image. This prevents or substantially prevents loss of seamlessness between the first image and the post-inverse-conversion second image in the synthetic image due to, for example, solidification of boundaries between the first image and the post-inverse-conversion second image in the synthetic image.

Then, the synthesis unit 418 converts the point of view in the post-inverse-conversion second image shown by a2 in FIG. 6. The post-inverse-conversion, post-viewpoint-conversion second image is synthesized with the first image shown by b in FIG. 6, so that one seamless synthetic image showing a rear view from the car is formed as shown in c in FIG. 6, and displayed on the left side monitor 5. This synthesis is performed by, for example, extracting a part in the post-inverse-conversion second image where the blocked range (that is, the range behind the car that is blocked from the left side camera 1 by the car) is captured, as an embedding image R, and by overwriting and replacing the part in the first image where the blocked range would be captured if the car were transparent, with the embedding image R.

According to this left image processing unit 41, it is possible to prevent or substantially prevent extremely large correction gain values from being calculated, compared to the case in which the ratios of the mean values of gradation values in the first comparative area in the first image to the mean values of gradation values in the second comparative area in the second image are directly calculated as correction gains. For example, when the respective mean values of the gradation values of the R components, G components, and B components in the first comparative area in the first image and the second comparative area in the second image are as shown in Table a of FIG. 7, and the ratios of the mean values of gradation values in the first comparative area in the first image and the mean values of gradation values in the second comparative area in the second image are calculated as correction gains, for example, the ratio of the mean value (18.76) of the B components' gradation values in the first comparative area in the first image to the mean value (0.48) of the B components' gradation values in the second comparative area in the second image is approximately 39.08, and a correction gain is calculated thus. Therefore, a given B component's gradation value in the second image synthesized into a synthetic image increases by approximately $39.08 \times a$ times, where a is the original gradation value of the B component.

On the other hand, as shown by a1 and a2 in FIG. 4, when an image conversion for converting R, G, and B values on a per pixel basis is applied to the first image and the second image, the mean value of gradation values in the first comparative area in the post-conversion first image is 137.38 and the mean value of gradation values in the second comparative area in the post-conversion second image is 128.24, so the ratio of the two mean values, which is approximately 1.07, is calculated as a correction gain. Then, a given B component's gradation value in the post-inverse-conversion second image to be synthesized into a synthetic image is $2 \times [\{G \times (a/2+128)\}-128]$, where a is the original gradation value and G is the correction gain. The gradation value of the B component increases by $2 \times [\{G \times (a/2+128)\}-128]-a=(G-1)a+\{(G-1) \times 256\}$ from its original gradation value a. In the event the table b in FIG. 7 is used, the increase of the B component's gradation value in the post-inverse-conversion second image from its original gradation value can be kept small at $(0.07 \times a)+17.92$.

Also, when, as shown by b1 and b2 in FIG. 4, an image conversion for converting R, G, and B values on a per pixel basis is applied to the first image and the second image, the mean value of gradation values in the first comparative area in the post-conversion first image is 146.76, and the mean value of gradation values in the second comparative area in the post-inverse-conversion second image is 128.48, and the ratio of the two mean values, which is approximately 1.14, is calculated as a correction gain. Then, a given B component's gradation value in the post-inverse-conversion second image to be synthesized into a synthetic image is $\{G \times (a+128)\}-128\}$, where a is the original gradation value and G is the correction gain. This gradation value of the B component increases by $\{G \times (a+128)\}-128\}-a=(G-1)a+\{(G-1) \times 128\}$ from its original gradation value a. In the event the table c in FIG. 7 is used, the increase of the B component's gradation value in the post-inverse-conversion second image from its original gradation value can be kept small at $(0.14 \times a)+5.12$.

Figure 8A:
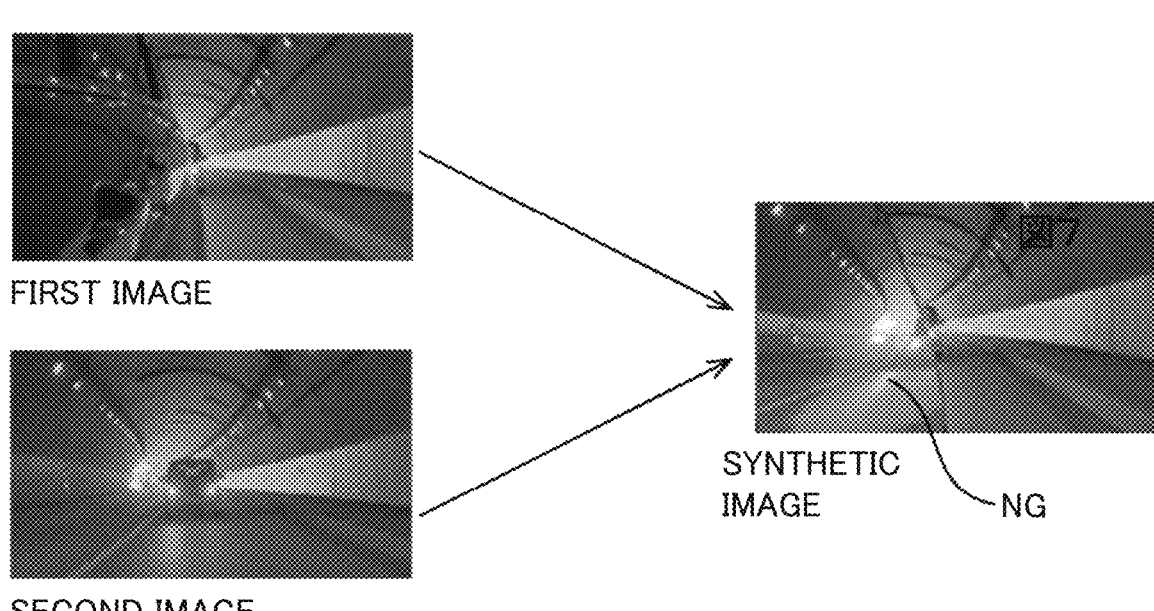
FIG. 8A is a diagram showing an example effect brought about by an embodiment of the present disclosure.
Figure 8B:
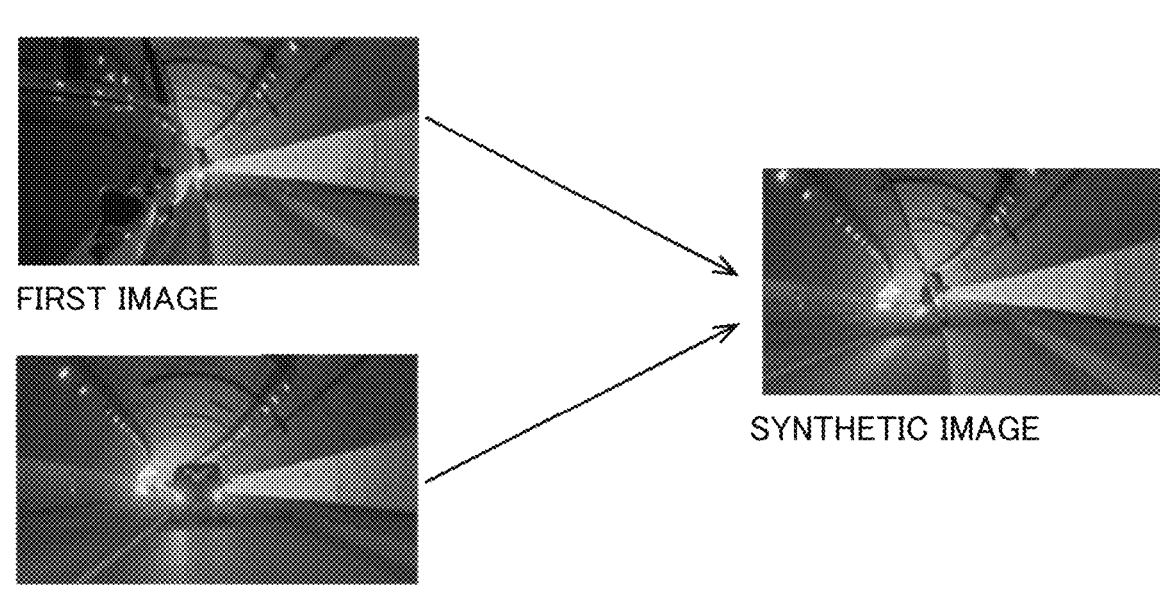
FIG. 8B is a diagram showing an example effect brought about by an embodiment of the present disclosure.

Therefore, according to the present embodiment, when the ratio between a mean value of gradation values in the first comparative area in the first image and a mean value of gradation values in the second comparative area in the second image is calculated as a correction gain, as shown in FIG. 8A, it is possible to prevent a situation in which a post-conversion second image is corrected based on a correction gain that is excessively large and the gradation values of the post-correction second image are saturated due to the correction, and in which NG parts with strange color tone are produced in a synthetic image incorporating the post-correction second image. This situation can be prevented or substantially prevented from occurring in most image-capturing scenes, so that a flawless synthetic image can be generated and displayed as shown in FIG. 8B.

Also, in the types of image conversion shown by b1, b2, and b3 in FIG. 4 and c1, c2, and c3 in FIG. 4, the process of adding and subtracting 128 to and from the gradation values, the process of multiplying the gradation values by ½ or 2, and so forth can be implemented by a simple operation such as applying a bit shift to data that represents the gradation values. By using these techniques of image conversion, the generation and display of flawless synthetic images can be realized based on simple procedures.

An embodiment of the present disclosure has been described above. Referring back to the above embodiment, when the first image and the second image are images with 256 levels of gradation from the first level to the 256-th level, an image conversion may be performed in which either: (1) the maximum value that is obtained when there is no value that exceeds 256 even after 128 is added to the maximum values among the gradation values of pixels of the first image and to the maximum values among the gradation values of pixels of the second image; or (2) the gradation values obtained by adding the value that is largest among the values to the power of 2 and that is less than the maximum value of (1) to the pre-conversion images, are used as the gradation values of the post-conversion images.

Alternatively, when there are no values that exceed 256 after 128 is added to the maximum values among the gradation values of pixels of the first image and to the maximum values among the gradation values of pixels of the second image, the image conversion in this case may be performed such that the gradation values obtained by adding 128 to the gradation values of the pre-conversion images are used as the gradation values of the post-conversion images. Alternatively, if there are values that exceed 256 after 128 is added to the maximum values among the gradation values of pixels of the first image and to the maximum values among the gradation values of pixels of the second image, the image conversion in this case may be performed such that the gradation values of the pre-conversion images are multiplied by 2 and then 128 is added to them, and the resulting values are used as the gradation values of the post-conversion images.

Also, although the first image and second image in the above embodiment have been described as images in which the values of R, G, and B components serve as pixel values, the first image and second image may be images in which brightness values and two-color difference values, such as Y—Cb—Cr values, serve as pixel values. In this case, the above-described correction process for the second image may be applied only to the Y component of brightness values. That is, for example:

(1) given the first image and the second image, images that corresponds to the Y components of the brightness values alone may be generated;

(2) the images may be used as the first image and second image, and, as described earlier, the image conversion by the first image conversion unit 411 and second image conversion unit 412, the calculation of correction gains by the first comparative image extracting unit 413, second comparative image extracting unit 414, and correction gain calculation unit 415, the correction by the correction unit 416, and the image conversion by the second image inverse-conversion unit 417 may be performed; and, meanwhile, (3) the images generated by replacing the Y components of brightness values in the second image with the post-inverse-conversion image output from the second image inverse-conversion unit 417 may be synthesized with the first image in the synthesis unit 418.

However, the types of image conversion shown by b1, b2, and b3 in FIG. 4 and c1, c2, and c3 in FIG. 4 may be modified as appropriate according to the number of "Y" bits in brightness values.

Also, although a case has been described with the above embodiment in which the post-inverse-conversion second image and the first image are synthesized, it is also possible to provide a first image inverse-conversion part, in which an image conversion that works as an inverse conversion for the image conversion performed at the first image conversion unit 411 is applied to the post-conversion first image to generate a post-inverse-conversion first image, and synthesize the post-inverse-conversion second image and the post-inverse-conversion first image in the synthesis unit 418.

Also, although a case has been described above in which images captured by the left side camera 1 and right side camera 3 provided on the side of the car and an image captured by the back camera 2 provided in a rear part of the car are synthesized to generate an image showing the car's rear view, according to the present embodiment, images around a car may be captured by multiple cameras having partially-overlapping fields of view, subjected to a viewpoint conversion, and synthesized to generate a bird's-eye view that shows the surroundings of the car from above. However, the present invention is equally applicable to any case of image synthesis in which images captured by multiple cameras having partially-overlapping fields of view are synthesized, including cases the cameras are not mounted in a car.

What is claimed is:

1. A synthetic image generation system for generating a synthetic image by synthesizing a first image captured by a first camera and a second image captured by a second camera, at least a part of a field of view of the first camera and at least a part of a field of view of the second camera overlapping each other, the synthetic image being an image in which at least a part of the first image and at least a part of the second image are joined together, the synthetic image generation system comprising circuitry configured to:

apply a predetermined image conversion to the first image to generate a post-conversion first image;

apply the predetermined image conversion to the second image to generate a post-conversion second image;

set a first comparative area in the post-conversion first image, the first comparative area being a part of an overlapping area of the field of view of the first camera and the field of view of the second camera:

set a second comparative area in the post-conversion second image, the second comparative area corresponding to the first comparative area such that a same object is captured in the first comparative area and the second comparative area;

extract an image in the first comparative area from the post-conversion first image as a first comparative image;

extract an image in the second comparative area from the post-conversion second image as a second comparative image;

calculate a ratio of a representative value among pixel values of the first comparative image to a representative value among pixel values of the second comparative image as a correction gain for the post-conversion second image;

correct the post-conversion second image based on the correction gain to generate a post-correction second image;

apply an inverse conversion of the predetermined image conversion to the post-correction second image to generate a post-inverse-conversion second image; and synthesize the post-inverse-conversion second image with the first image or with an image obtained by applying the inverse-conversion of the predetermined image conversion to the post-conversion first image, to generate a synthetic image, wherein the predetermined image conversion is performed such that a ratio of a pixel value in the post-conversion first image, obtained from a first pixel value in the first image through the predetermined image conversion, to a pixel value in the post-conversion second image, obtained from a second pixel value in the second image through the predetermined image conversion, is closer to 1 than is a ratio of the first pixel value to the second pixel value.

2. The synthetic image generation system according to claim 1, wherein, in the predetermined image conversion, a range of pixel values is converted in the first image and in the second image such that at least a value that serves as a lower limit of the range of pixel values in the first image and the second image is larger than before the predetermined image conversion is performed.

3. The synthetic image generation system according to claim 1, wherein, in the predetermined image conversion, a pixel value in the first image and a pixel value in the second image are subjected to a multiplication by 1/n (where n>1) and then to an addition of m (where m>0), and post-multiplication, post-addition pixel values serve as pixel values in the post-conversion first image and the post-conversion second image.

4. The synthetic image generation system according to claim 1, wherein, in the predetermined image conversion, a pixel value in the first image and a pixel value in the second image are subjected to an addition of m (where m>0), and post-addition values serve as pixel values in the post-conversion first image and the post-conversion second image.

5. The synthetic image generation system according to claim 1, wherein the predetermined image conversion is performed such that a pixel value in the first image and a pixel value in the second image are subjected to an addition of m (where m>0), wherein, when a value that exceeds a maximum value that the pixel value in the first image and the pixel value in the second image can take is not produced among post-addition pixel values, the post-addition pixel values serve as pixel values in the post-conversion first image and the post-conversion second image, and wherein, when the value that exceeds the maximum value is produced among the post-addition pixel values, the pixel value in the first image and the pixel value in the second image are subjected to a multiplication by 1/n (where n>1) and then to the addition of m, and post-multiplication, post-addition values serve as the pixel values in the post-conversion first image and the post-conversion second image.

6. The synthetic image generation system according to claim 1, wherein the pixel values of the first image and the second image are gradation values of R components, G components, and B components of the first image and the second image, wherein the circuitry is further configured to calculate a ratio of a representative value among gradation values of pixels of the first comparative image taken from the first image, to a representative value among gradation values of pixels of the second comparative image taken from the second image, as the correction gain, for each of the R components, G components, and B components of the post-conversion second image, and correct gradation values of pixels of the post-conversion second image, for each of the R components, G components, and B components of the post-conversion second image, based on respective correction gains calculated.

7. The synthetic image generation system according to claim 1, wherein the pixel values of the first image and the second image are brightness values of the first image and the second image, wherein the circuitry is further configured to calculate a ratio of a representative value among brightness values of pixels of the first comparative image taken from the first image, to a representative value among brightness values of pixels of the second comparative image taken from the second image, as the correction gain, and correct brightness values of pixels of the post-conversion second image based on the correction gain.

8. The synthetic image generation system according to claim 1, wherein the pixel values of the first image and the second image are gradation values of R components, G components, and B components of the first image and the second image, wherein the circuitry is further configured to calculate a ratio of a representative value among gradation values of pixels of the first comparative image taken from the first image, to a representative value among gradation values of pixels of the second comparative image taken from the second image, as the correction gain, for each of the R components, G components, and B components of the post-conversion second image, and correct gradation values of pixels of the post-conversion second image, for each of the R components, G components, and B components of the post-conversion second image, based on respective correction gains calculated, wherein the R components, G components, and B components of the first image and the second image are represented in 256 levels of gradation, and wherein the predetermined image conversion is performed such that a gradation value in the first image and a gradation value in the second image are subjected to a multiplication by 1/2 and then to an addition of 128, for each of the R components, G components, and B components of the first image and the second image, and post-multiplication, post-addition values serve as gradation values in the post-conversion first image and the post-conversion second image.

9. The synthetic image generation system according to claim 1, wherein the pixel values of the first image and the second image are gradation values of R components, G components, and B components of the first image and the second image, wherein the circuitry is further configured to calculate a ratio of a representative value among gradation values of pixels of the first comparative image taken from the first image, to a representative value among gradation values of pixels of the second comparative image taken from the second image, as the correction gain, for each of the R components, G components, and B components of the post-conversion second image, and correct gradation values of pixels of the post-conversion second image, for each of the R components, G components, and B components of the post-conversion second image, based on respective correction gains calculated, wherein the R components, G components, and B components of the first image and the second image are represented in 256 levels of gradation, and wherein the predetermined image conversion is performed such that gradation values in a pre-conversion image are subjected to an addition of 128, for each of the R components, G components, and B components of the pre-conversion image, and post-addition values serve as lower gradation values in a post-conversion image with an increased number of levels of gradation.

10. The synthetic image generation system according to claim 1, wherein the representative value is a mean value.

11. A rear image display system including the synthetic image generation system of claim 1 and mounted in a car, the rear image display system comprising:

a monitor configured to display the synthetic image generated by the synthetic image generation system;

a first camera configured to capture an image showing a rear view from the car seen from a side part of the car; and a second camera configured to capture an image showing a rear view from the car seen from a rear part of the car.

* * * * *